(12) United States Patent
Lin et al.

(10) Patent No.: US 12,422,881 B2
(45) Date of Patent: Sep. 23, 2025

(54) BUTTON STRUCTURE AND ELECTRONIC DEVICE

(71) Applicant: PEGATRON CORPORATION, Taipei (TW)

(72) Inventors: Chuan-Yuan Lin, Taipei (TW);
Hui-Chen Wang, Taipei (TW);
Chan-Wei Kuo, Taipei (TW); Yu-Peng Lai, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 250 days.

(21) Appl. No.: 18/210,711

(22) Filed: Jun. 16, 2023

(65) Prior Publication Data
US 2024/0061463 A1 Feb. 22, 2024

(30) Foreign Application Priority Data
Aug. 18, 2022 (TW) .................................. 111131055

(51) Int. Cl.
| | |
|---|---|
| *G06F 1/16* | (2006.01) |
| *G05G 1/02* | (2006.01) |
| *G05G 5/05* | (2006.01) |
| *H05K 5/00* | (2025.01) |
| *H05K 7/00* | (2006.01) |
| *H04M 1/02* | (2006.01) |

(52) U.S. Cl.
CPC ................. *G05G 5/05* (2013.01); *G05G 1/02* (2013.01); *G06F 1/1633* (2013.01); *G05G 2505/00* (2013.01); *H04M 1/026* (2013.01)

(58) Field of Classification Search
CPC .......... G05G 5/05; G05G 1/02; G06F 1/1633; G06F 1/1656; G06F 1/1684; H04M 1/026
See application file for complete search history.

(56) References Cited

U.S. PATENT DOCUMENTS 5,545,865 A * 8/1996 Gotou .................... H01H 13/14
200/341
6,963,039 B1 * 11/2005 Weng .................... H01H 25/041
200/302.1

(Continued)

FOREIGN PATENT DOCUMENTS

| CN | 112750640 B | 7/2022 |
|---|---|---|
| EP | 4020513 A1 | 6/2022 |

(Continued)

OTHER PUBLICATIONS

European Patent Office, Search Report issued on Jan. 5, 2024 for EP application No. 23181394.0.

*Primary Examiner* — Anthony M Haughton
(74) *Attorney, Agent, or Firm* — Li & Cai Intellectual Property (USA)

(57) ABSTRACT

A button structure and an electronic device are provided. The electronic device includes a housing and a button structure disposed at the housing. The button structure includes a button body and an elastic body. The button body includes a keycap and a pillar portion. The keycap is connected to one end of the pillar portion. The elastic body is sleeved on the pillar portion, and one end of the elastic body includes a first engaging portion. The first engaging portion is capable of being engaged with a part of the housing.

10 Claims, 5 Drawing Sheets

(56) References Cited

U.S. PATENT DOCUMENTS

| | | | | |
|---|---|---|---|---|
| 7,355,137 | B2* | 4/2008 | Kawasaki | H04M 1/18 |
| | | | | 200/302.1 |
| 9,859,072 | B2* | 1/2018 | Rong | H01H 13/06 |
| 9,953,775 | B2* | 4/2018 | Kim | H01H 13/86 |
| 10,636,591 | B1* | 4/2020 | Lin | H01H 9/04 |
| 12,237,121 | B2* | 2/2025 | Ye | H01H 13/06 |
| 2011/0214976 | A1 | 9/2011 | Bloch | |
| 2016/0365203 | A1* | 12/2016 | Hidai | G05G 1/02 |
| 2017/0287656 | A1* | 10/2017 | Rong | H01H 13/06 |
| 2018/0358190 | A1* | 12/2018 | Lee | H04M 1/23 |
| 2021/0128261 | A1 | 5/2021 | Zheng et al. | |
| 2021/0212230 | A1* | 7/2021 | Hsu | H04B 17/27 |
| 2023/0266717 | A1* | 8/2023 | Yang | H01H 13/06 |
| | | | | 361/679.01 |

FOREIGN PATENT DOCUMENTS

| | | | |
|---|---|---|---|
| JP | 201532417 | A | 2/2015 |
| TW | I673739 | B | 10/2019 |

* cited by examiner

BUTTON STRUCTURE AND ELECTRONIC DEVICE

CROSS-REFERENCE TO RELATED PATENT APPLICATION

This application claims the benefit of priority to Taiwan Patent Application No. 111131055, filed on Aug. 18, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a button structure and an electronic device, and more particularly to a button structure with waterproof function and an electronic device with the button structure.

BACKGROUND OF THE DISCLOSURE

In an electronic device, such as a smart phone or a tablet computer, a button is usually located on the edge of a housing of the electronic device, and the button usually has a waterproof structure. When the user presses the button, the button will touch a switching element inside the electronic device to perform a specific function, such as adjusting the volume or turning on or off the screen. However, in the related art, the waterproof structure can easily fall off from the button as a result of repeated pressing, thus causing the button to have a poor waterproof performance.

SUMMARY OF THE DISCLOSURE

In response to the above-referenced technical inadequacy, the present disclosure provides a button structure and electronic device to address the inadequacy of poor waterproof performance of the button.

In one aspect, the present disclosure provides a button structure disposed at a housing. The button structure includes a button body and an elastic body. The button body includes a keycap and a pillar portion, and the keycap is connected to one end of the pillar portion. The elastic body is sleeved on the pillar portion, and one end of the elastic body includes a first engaging portion. The first engaging portion is capable of being engaged with a part of the housing.

In another aspect, the present disclosure provides an electronic device, which includes a housing and a button structure. The housing has an opening, an outer wall, and an accommodating groove. The opening communicates with the accommodating groove, and the outer wall is located between the opening and the accommodating groove. The button structure is disposed at the housing. The button structure includes a button body and an elastic body. The button body includes a keycap and a pillar portion, and the keycap is connected to one end of the pillar portion. The keycap is disposed within the opening. The pillar portion is accommodated in the accommodating groove. The elastic body is sleeved on the pillar portion. One end of the elastic body includes a first engaging portion, and the first engaging portion is engaged with the outer wall.

Therefore, in the button structure and the electronic device provided by the present disclosure, by virtue of one end of the elastic body including the first engaging portion, the first engaging portion of the elastic body can be fixed to the housing when the elastic body is sleeved on the pillar portion, and the stability of the elastic body sleeved on the button structure can be improved so as to enhance the interference connection between the elastic body and the housing. In this way, moisture existing in an external environment cannot pass through the gap between the elastic body and the housing, thereby improving the waterproof performance of the button structure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 1:
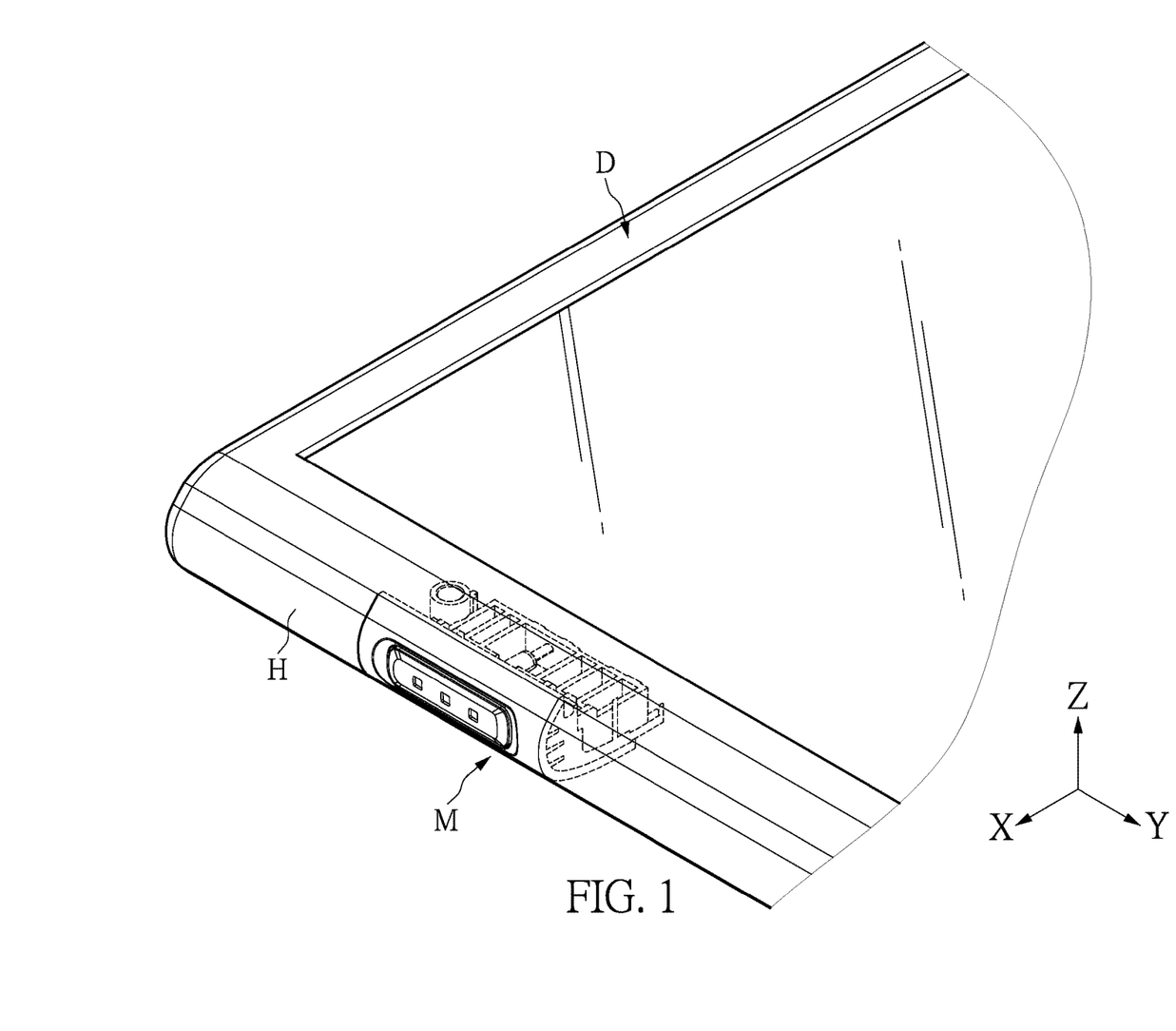
FIG. 1 is a schematic view of a button structure applied to an electronic device according to the present disclosure.

Referring to FIG. 1, FIG. 1 is a schematic view of a button structure applied to an electronic device according to the present disclosure. The present disclosure provides an electronic device D, such as a tablet computer or a smart phone, and the present disclosure is not limited thereto. The electronic device D includes a housing H and a button structure M adapted to be disposed at the housing H.

Figure 2:
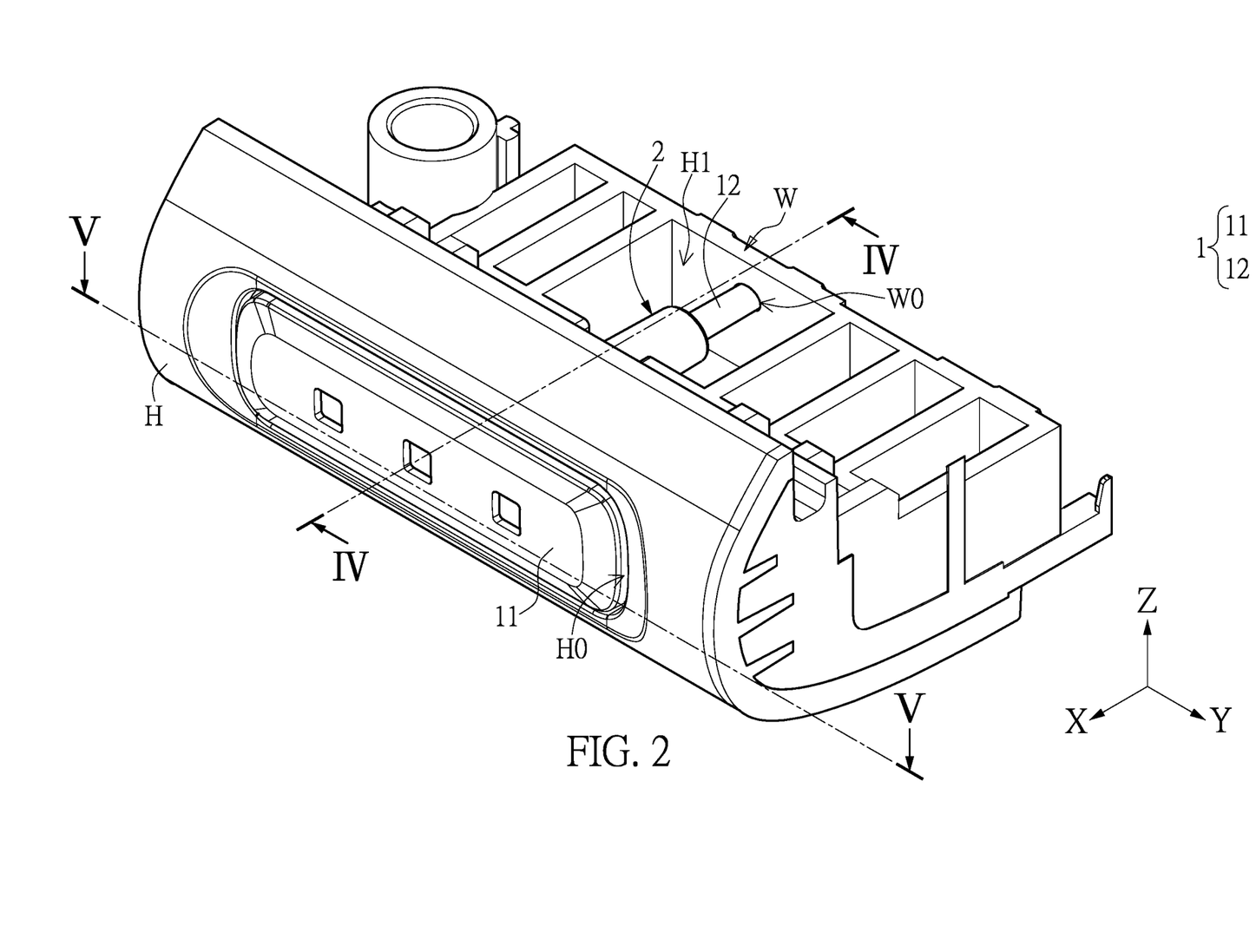
FIG. 2 is a schematic enlarged view of the button structure being disposed at a housing of the electronic device according to the present disclosure.
Figure 3:
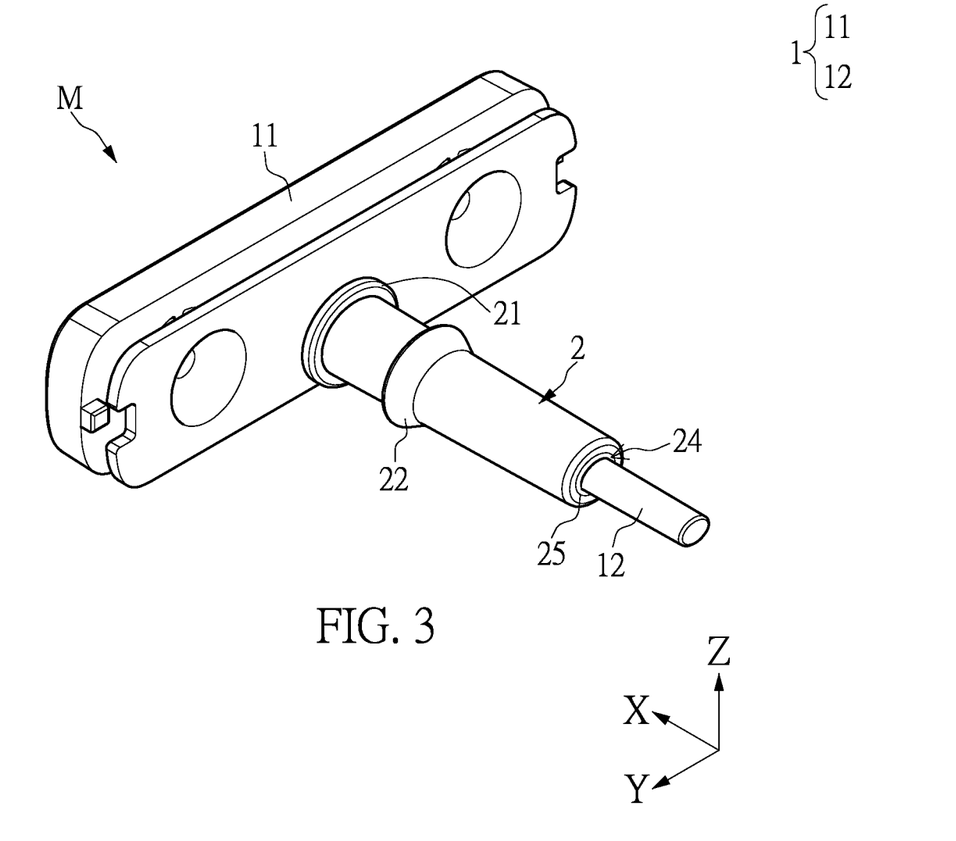
FIG. 3 is a schematic perspective view of the button structure according to the present disclosure.
Figure 4:
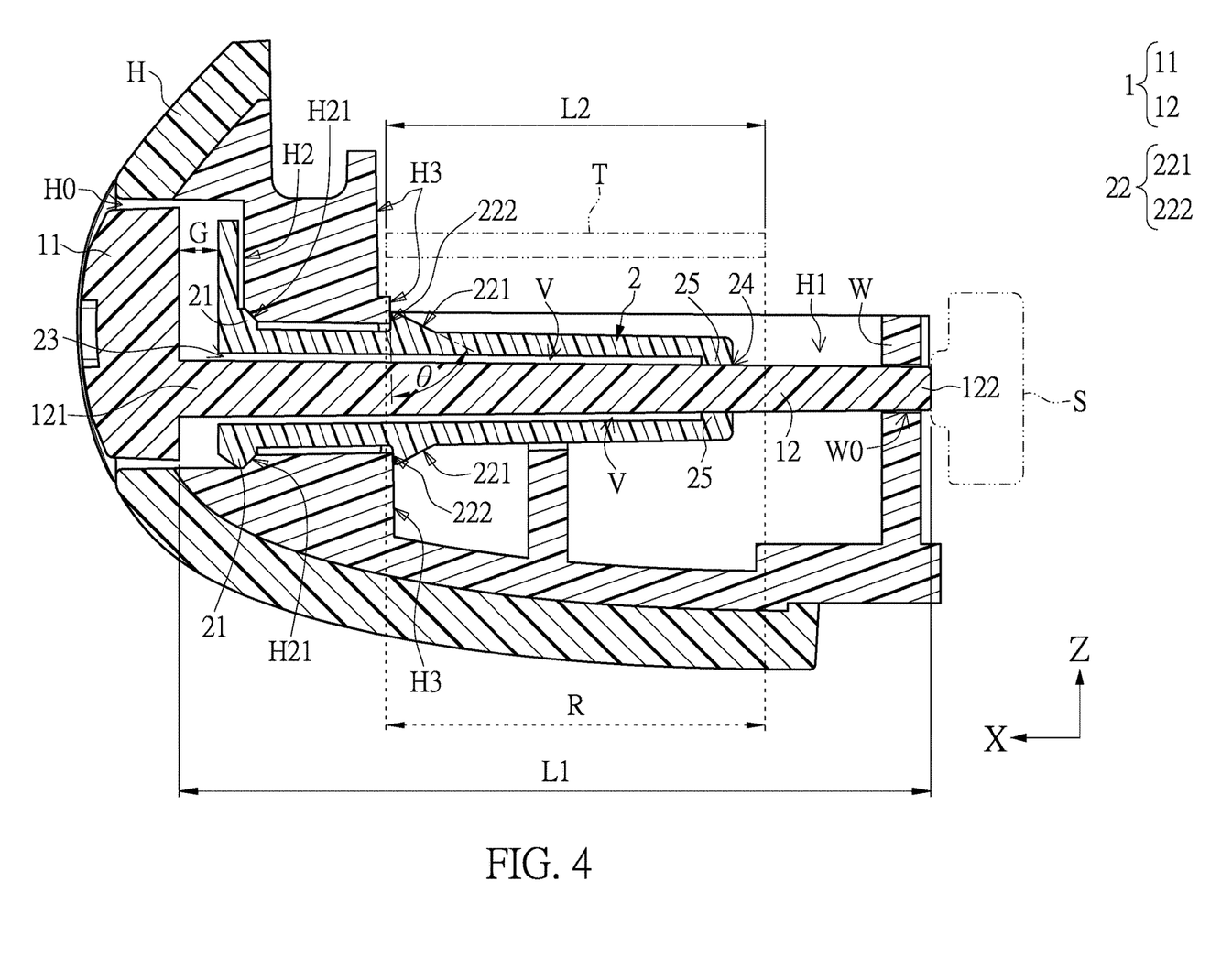
FIG. 4 is a schematic cross-sectional view taken along line IV-IV of FIG. 2.

Referring to FIG. 2, FIG. 3, and FIG. 4, FIG. 2 is a schematic enlarged view of the button structure being disposed at a housing of the electronic device according to the present disclosure, FIG. 3 is a schematic perspective view of the button structure according to the present disclosure, and FIG. 4 is a schematic cross-sectional view taken along line IV-IV of FIG. 2. It should be noted that, in order to keep the drawings concise, lines that are not directly relevant to the present disclosure are partly omitted in FIG. 4. In FIG. 4, the housing H has an opening H0, an accommodating groove H1, and an outer wall H2. The opening H0 communicates with the accommodating groove H1, and the outer wall H2 is located between the opening H0 and the accommodating groove H1. The button structure M includes a button body 1 and an elastic body 2. The button body 1 includes a keycap 11 and a pillar portion 12. The pillar portion 12 has a first end 121 and a second end 122, and the keycap 11 is connected to the first end 121 of the pillar portion 12. The keycap 11 is disposed within the opening H0, and the pillar portion 12 is accommodated in the accommodating groove H1.

As shown in FIGS. 3 and 4, the elastic body 2 is sleeved on the pillar portion 12. One end of the elastic body 2 includes a first engaging portion 21, and the first engaging portion 21 is fittingly engaged with a part of the housing H. The elastic body 2 further includes a second engaging portion 22. The second engaging portion 22 is disposed adjacent to the first engaging portion 21 and fittingly engaged with another part of the housing H. Specifically, the housing H further includes an inner wall H3, and the inner wall H3 is located adjacent to the accommodating groove H1. In the embodiment, the first engaging portion 21 is fittingly engaged with the outer wall H2, and the second engaging portion 22 is fittingly engaged with the inner wall H3. For example, the first engaging portion 21 and the second engaging portion 22 can be convex structures, but the present disclosure is not limited thereto. The first engaging portion 21 has a round corner. In addition, as shown in FIG. 3, the first engaging portion 21 and the second engaging portion 22 are annular in shape and protrude in a direction away from the pillar portion 12. The outer wall H2 includes an inclined surface H21 corresponding to the round corner of the first engaging portion 21. The first engaging portion 21 being the convex structure may be elastically deformed while abutting against the inclined surface H21 as shown in FIG. 4. Thus, the interference connection between the outer wall H2 and the first engaging portion 21 is formed to improving the waterproof performance of the button structure.

Reference is further made to FIG. 4, and the second engaging portion 22 includes a first surface 221 and a second surface 222 connected to each other. The second surface 222 is parallel to and against the inner wall H3 of the housing H. An included angle θ is formed between the first surface 221 and the second surface 222, and the included angle θ is less than 90 degrees. When the keycap 11 is pressed to push the pillar portion 12 to move into the housing H by a user, the elastic body 2 can be slightly stretched and deformed. When the keycap 11 is released by the user, the elastic body 2 recovers to its original length immediately. Therefore, during the process of pressing and releasing the keycap 11, the pillar portion 12 moves back and forth, and the elastic body 2 also stretches repeatedly. Accordingly, the elastic body 2 can be fixed on the housing H by the first engaging portion 21 and the second engaging portion 22. In addition, the structural strength of the second engaging portion 22 can be improved through the design that the included angle θ is less than 90 degrees, and the stability of the elastic body 2 can be improved by the way of the first engaging portion 21 and the second engaging portion 22 fixing the elastic body 2.

Figure 5:
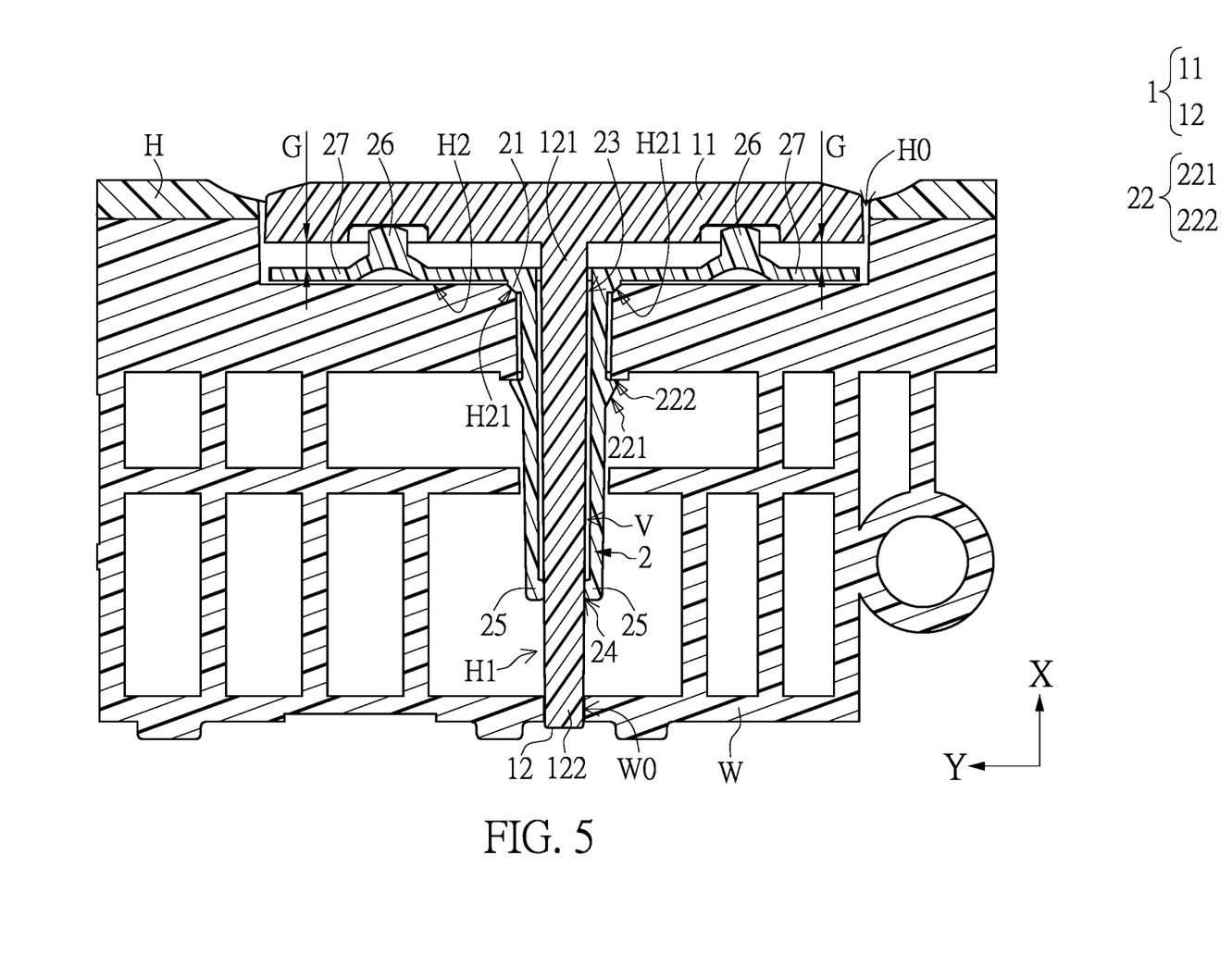
FIG. 5 is a schematic cross-sectional view taken along line V-V of FIG. 2.

Reference is made to FIG. 5, and FIG. 5 is a schematic cross-sectional view taken along line V-V of FIG. 2. The elastic body 2 further includes at least one connection portion 26 and a flat portion 27. The connection portion 26 disposed at the flat portion 27 and protrudes toward keycap 11 to be a convex structure. The keycap 11 may have at least one concave portion corresponding to the connection portion 26. The connection portion 26 is connected to the concave portion of the keycap 11 by the adhesive. The flat portion 27 is disposed at the outer wall H2 and connected to the first engaging portion 21. The gap G is formed between the bottom surface of the keycap 11 and the flat portion 27. In this embodiment, the number of the connection portion is two, but the present disclosure is not limited thereto.

Reference is further made to FIGS. 3 and 4, and the elastic body 2 includes a first through hole 23 and a second through hole 24. The pillar portion 12 is used for passing through the first through hole 23 and the second through hole 24, such that the elastic body 2 is sleeved on the pillar portion 12. For example, the elastic body 2 can be a hollow sleeve made of rubber, but the appearance and material of the elastic body 2 are not limited in the present disclosure.

The electronic device D further includes a switching element S disposed in the housing H, and the housing H further includes a supporting wall W. The supporting wall W has a position limiting hole W0. The switching element S can control specific functions of the electronic device D, such as turning on or off the screen and the power, or adjusting the volume of the electronic device D. The button structure M can be a screen button, a power button, or a volume button, and the present disclosure is not limited thereto.

Reference is further made to FIG. 4. The pillar portion 12 passes through the first through hole 23, the second through hole 24, and the position limiting hole W0 and abuts against the switching element S. The keycap 11 is disposed at the opening H0 and is exposed from the housing H. The gap G is formed between the keycap 11 and the elastic body 2. The gap G is a maximum moving distance generated when the keycap 11 is pressed, and the maximum moving distance is a stroke of the pillar portion 12. Therefore, the keycap 11 is pressed to push the pillar portion 12, such that the pillar portion 12 is moved into the housing H and trigger the switching element S to switch the electronic device D on or off, or adjust the volume of the electronic device D.

In addition, as shown in FIG. 4, another end of the elastic body 2 further includes a third engaging portion 25. The third engaging portion 25 protrudes toward and abuts against the pillar portion 12. The third engaging portion 25 is disposed around a hole wall of the second through hole 24. When the elastic body 2 is sleeved on the pillar portion 12, the inner wall of the elastic body 2 can be in tight contact with a surface of the pillar portion 12. Alternatively, as shown in FIG. 4, there may be a gap V between the inner wall of the elastic body 2 and the surface of the pillar portion 12.

Therefore, the elastic body 2 of the button structure M can be fittingly engaged with the outer wall H2 of the housing H through the first engaging portion 21, and can be fittingly engaged with the inner wall H3 of the housing H through the second engaging portion 22, such that the interference connection between the elastic body 2 and the housing H is formed. Moisture existing in the external environment cannot pass through the gap between the elastic body 2 and the housing H. In addition, the third engaging portion 25 of the elastic body 2 is a convex structure protruded toward the pillar portion 12, and may be elastically deformed while abutting against the pillar portion 12, such that the interference connection between the elastic body 2 and the pillar portion 12 is formed. Therefore, even though the electronic device D has the gap V, moisture from the external environment cannot infiltrate into the electronic device D through the gap V located between the elastic body 2 and the pillar portion 12.

In conclusion, in the electronic device D and the button structure M thereof provided by the present disclosure, by the structural design of the button structure M including the keycap 11 and the pillar portion 12, the pillar portion 12 can extend into the electronic device D. The electronic device D further includes an antenna element T and a clearance area R below the antenna element T. FIG. 4 shows relative positions of the antenna element T, the button structure M, and the switching element S. The switch element S is disposed opposite to the button body 1, and the clearance area R is an area below the antenna element T. The clearance area R overlaps a part of the pillar portion 12 and the elastic body 2, while the switching element S is kept away from the clearance area R. The switching element S is disposed at a position away from the clearance area R. A length L1 of the pillar portion 12 is greater than a length L2 of the overall structure of the antenna element T, that is to say, the size of the pillar portion 12 exceeds the range of the clearance area R. Therefore, the switching element S can be arranged in a deeper area of the electronic device D away from the antenna element T, and the pillar portion 12 can still abut against the switching element S to effectively improve the utilization rate of the internal space of the electronic device D. In addition, a length of the elastic body 2 may be about four-fifths of the length L1 of the pillar portion 12. By the structural design of the elastic body 2 including the first engaging portion 21, the pillar portion 12 can be clamped on the housing H without detachment.

In addition, in the elastic body 2 of the button structure M provided by the present disclosure, by the structural design of the second through hole 24, the pillar portion 12 can pass through the second through hole 24 to directly contact the switching element S. The length of the pillar portion 12 is not limited by the elastic body 2. At the same time, the elastic body 2 of the button structure M can also achieve the waterproof performance through the third engaging portion 25 being disposed around the hole wall of the second through hole 24.

Furthermore, since the pillar portion 12 is lengthened, it is easy to cause the center of gravity of the button structure M to be unstable when the keycap 11 is pressed by the user, resulting in the eccentric phenomenon. In other words, the second end 122 of the pillar portion 12 used for contacting the switching element S is offset and not aligned with the switching element S. Therefore, by the structural design of the second through hole 24 and the third engaging portion 25 of the elastic body 2 and the position limiting hole W0 of the housing H, the pillar portion 12 can pass through the second through hole 24 and be limited in position. Moreover, the second end 122 of the pillar portion 12 can be aligned with the switching element S through the third engaging portion 25 abutting against the pillar portion 12, such that it can solve that the center of gravity of the button body 1 is unstable and eccentric due to the longer length L1 of the pillar portion 12.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A button structure applied to an electronic device including a housing, an antenna element, and a switching element, the housing including a supporting wall, the supporting wall having a position limiting hole, the switching element being arranged away from the antenna element, the button structure comprising:
   a button body including a keycap and a pillar portion, wherein the keycap is connected to one end of the pillar portion, and a length of the pillar portion is greater than a length of the antenna element; and
   an elastic body sleeved on the pillar portion, wherein one end of the elastic body includes a first engaging portion, the first engaging portion is capable of being engaged with a part of the housing, the elastic body further includes a first through hole and a second through hole, and the pillar portion passes through the first through hole, the second through hole, and the position limiting hole, and abuts against the switching element.

2. The button structure according to claim 1, wherein the elastic body further includes a second engaging portion disposed adjacent to the first engaging portion, and the second engaging portion is capable of being engaged with another part of the housing.

3. The button structure according to claim 2, wherein the first engaging portion and the second engaging portion are annular in shape and protrude in a direction away from the pillar portion.

4. The button structure according to claim 2, wherein the second engaging portion includes a first surface and a second surface connected to each other, an included angle is formed between the first surface and the second surface, and the included angle is less than 90 degrees.

5. The button structure according to claim 2, wherein another end of the elastic body further includes a third engaging portion, and the third engaging portion protrudes toward the pillar portion and abuts against the pillar portion.

6. An electronic device, comprising:
   a housing including an opening, an outer wall, a supporting wall, and an accommodating groove, wherein the opening communicates with the accommodating groove, the outer wall is located between the opening and the accommodating groove, and the supporting wall has a position limiting hole;
an antenna element and a switching element disposed in the housing, wherein the switching element is arranged away from the antenna element; and
a button structure disposed at the housing and comprising:
  a button body including a keycap and a pillar portion, wherein the keycap is connected to one end of the pillar portion, the keycap is disposed within the opening, and the pillar portion is accommodated in the accommodating groove, and a length of the pillar portion is greater than a length of the antenna element; and
  an elastic body sleeved on the pillar portion, wherein one end of the elastic body includes a first engaging portion, and the first engaging portion is engaged with the outer wall, the elastic body further includes a first through hole and a second through hole, and the pillar portion passes through the first through hole, the second through hole, and the position limiting hole, and abuts against the switching element.

7. The electronic device according to claim 6, wherein the elastic body further includes a second engaging portion disposed adjacent to the first engaging portion, the housing further includes an inner wall located adjacent to the accommodating groove, and the second engaging portion is capable of being engaged with the inner wall of the housing.

8. The electronic device according to claim 7, wherein the first engaging portion and the second engaging portion are annular in shape and protrude in a direction away from the pillar portion.

9. The electronic device according to claim 7, wherein the second engaging portion includes a first surface and a second surface connected to each other, the second surface is parallel to the inner wall of the housing, an included angle is formed between the first surface and the second surface, and the included angle is less than 90 degrees.

10. The electronic device according to claim 7, wherein another end of the elastic body further includes a third engaging portion, and the third engaging portion protrudes toward the pillar portion and abuts against the pillar portion.

* * * * *